July 31, 1951     D. NOLAN     2,562,677
COIL SPRING CLAMP AND RELEASABLE RETAINER THEREFOR
Filed Jan. 12, 1946
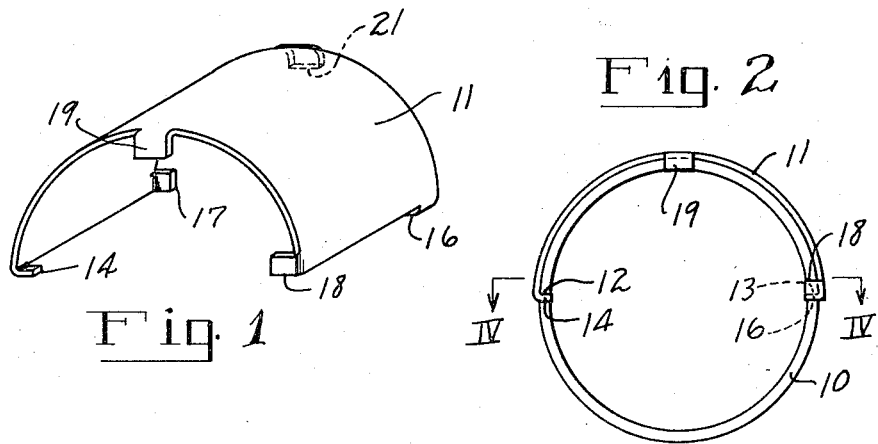
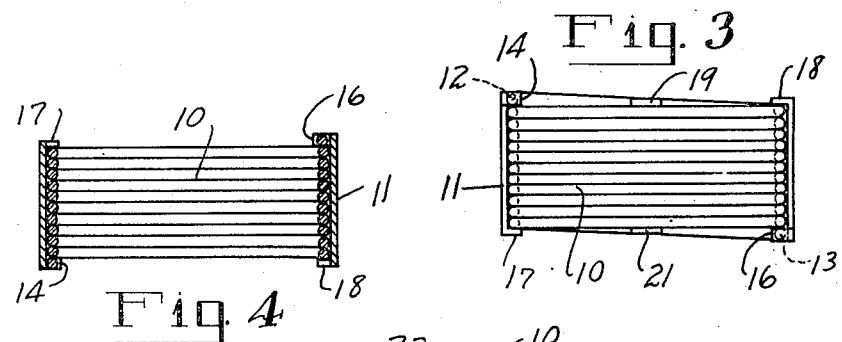
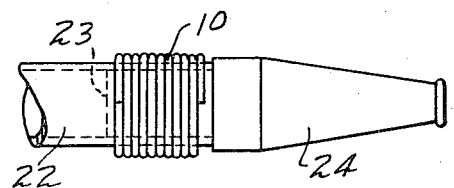
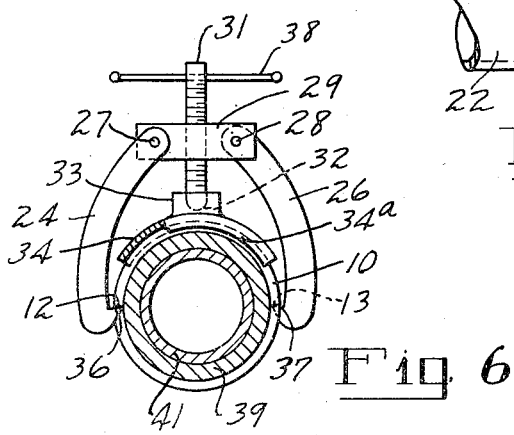
INVENTOR.
DUNCAN NOLAN
BY
ATTORNEY

Patented July 31, 1951

2,562,677

UNITED STATES PATENT OFFICE 2,562,677

COIL SPRING CLAMP AND RELEASABLE RETAINER THEREFOR

Duncan Nolan, Birmingham, Ala., assignor of one-half to N. S. Hare, Birmingham, Ala.

Application January 12, 1946, Serial No. 640,973

8 Claims. (Cl. 24—27)

My present invention relates to an improvement in resilient clamps and has for an object the provision of a clamp embodying a single spring element which may be placed around a hose and fitting or other members, with the convolutions of the spring expanded, so that when the spring is released the tension inherent in the metal from which it is formed causes it to contract, thus tightly gripping the hose and fitting.

Another object is to provide a resilient clamp embodying a spring adapted to fit about a hose or other member to be clamped, in association with a retainer to maintain the diameter of the spring expanded and which may be easily removed, thus to free the spring and permit it to contract about the hose.

A further object is to provide a resilient clamp which when placed on a hose embodies only a single spring, free of all projections and devices for tightening the same, and yet which effectively grips the hose completely around the periphery of the clamped section.

A further object is to provide a resilient spring clamp embodying the above enumerated features which uniformly grips the periphery of a hose with which it is associated, and which, when the section of hose in contact with the spring shrinks or deteriorates, continues to close itself around the hose, thus maintaining a leakproof joint.

A still further object of my invention is to provide a spring for securing a flexible hose to a fitting together with means to expand the spring in applying and removing it.

My invention is illustrated in the accompanying drawing, forming a part of this application, in which Fig. 1 is a perspective view of the retainer;

Fig. 2 is a side view of the spring positioned within the retainer;

Fig. 3 is a bottom view of Fig. 2;

Fig. 4 is a sectional view taken along lines IV—IV of Fig. 2;

Fig. 5 is a view of a hose and nozzle assembly showing my improved clamp mounted thereon; and Fig. 6 is a sectional view of an assembled hose and fitting with my improved spring clamp thereon and illustrating a tool that may be used to remove the same.

Referring now to the drawing for a better understanding of my invention, my improved clamp embodies a coil spring 10 which, prior to assembly about a hose is expanded and inserted within a semi-cylindrical retainer 11. As shown in the drawing, the ends 12 and 13 of the spring are retained by inturned lugs 14 and 16, formed on the lower edges at opposite ends of the semi-cylindrical retainer 11. The retainer is also provided with a pair of inturned flanges 17 and 18, formed on the ends of the retainer opposite the lugs 14 and 16, respectively, and adapted to bear against the end coils of the spring as shown more clearly in Fig. 3. A pair of downturned flanges 19 and 21 are provided at the top of the retainer 11, and these serve to further restrain the coils against endwise displacement.

Prior to assembly within the retainer 11, the spring has its diameter expanded by any suitable means, as for instance by forcing the same down upon a tapered rod, not shown, so that when the spring is positioned within the retainer 11, with its ends 12 and 13 resting on the lugs 14 and 16, the spring is under considerable tension which causes it to contract when the ends are released.

I have found that the flanges 17 and 18, and 19 and 21 prevent the convolutions of the spring from spreading outwardly from each other responsive to the forces set up therein by the restraining action imposed on ends 12 and 13 when they are seated on lugs 14 and 16.

In applying my improved clamp to a hose and fitting, the expanded spring is slipped over the hose to the position desired thereon, and the retainer 11 is removed by inserting any suitable tool such as a screw driver, and prying the retainer loose. As soon as either of the lugs 14 or 16 is disengaged from an end of the spring, the tension inherent in the spring causes it to tightly encircle the hose and clamp it.

Referring now to Fig. 5, I show a hose 22 which has been assembled about a fitting 23 of the usual nozzle 24 with my improved spring clamp 10 in place thereon. It will be apparent that there are no undesirable projections from the spring itself or tightening devices such as nuts and bolts, the spring itself forming a smooth, yet efficient clamp.

Referring now more particularly to Fig. 6, I show a form of tool which may be used for removing my improved clamp once it is in place. The tool embodies a pair of arms 24 and 26, pivoted as at 27 and 28 to a block 29. A screw 31 is threaded through the block and has a rounded lower end 32 rotatably mounted in a boss 33 formed on an arcuate block 34 adapted to fit about the spring clamp 10. The block 34 is provided with a depending shoulder 34a at each end fitting about the outer turns of the spring, thus restraining the coils against separating. The lower ends of the arms are provided with seats 36 and 37 which are adapted to engage the ends 12 and 13 of the spring clamp 10. The upper end of the screw 31 is provided with a handle 38. When the seats 36 and 37 are positioned beneath the ends 12 and 13 of the spring 10, and the handle rotated, the screw feeds through the block 29, presses against the arcuate block 34, thus causing the spring to expand in diameter. As soon as it has enlarged sufficiently, it may be disengaged from the hose 39 with which it is associated, and the hose withdrawn from the fitting 41.

While I have shown and described my improved clamp as being a coil spring formed of wire, it will be apparent to those skilled in the art that it may be made of any suitable form of coiled spring having the requisite strength, such for instance, as a flat helical spring. Also, while I have described my improved clamp as being more particularly adapted for use with flexible hose, it will be apparent that may be adapted to a member of other uses.

While I have shown my invention in but one form, it will be obvious to those skilled in the art that it is not so limited, but is susceptible of various changes and modifications, without departing from the spirit thereof, and I desire, therefore, that only such limitations shall be placed thereon as are specifically set forth in the appended claims.

What I claim is:

1. An article of manufacture for securing a hose to a fitting comprising an expanded coil spring, a substantially semi-cylindrical retainer for the spring having lugs thereon engaging the ends of the spring, and flanges on the retainer engaging the end coils of the spring.

2. An article of manufacture for securing a hose to a fitting comprising a coil spring, a semi-cylindrical retainer within which the spring fits, lugs on the retainer engaging the ends of the spring, and inturned flanges on the retainer engaging the end coils of the spring and holding them against endwise movement within the retainer.

3. An article of manufacture for securing a hose to a fitting comprising a coil spring, a semi-cylindrical retainer fitting over the spring, inturned lugs formed on diagonally opposed corners of the retainer engaging the ends of the spring, and inturned flange formed on each end of the retainer opposite the lugs, and other inturned flanges formed on the ends of the retainer and engaging the end coils of the spring.

4. A clamp for hose and the like comprising an expanded coil spring, a substantially semi-cylindrical retainer fitting about the spring and of a radius approximating the radius of the spring in expanded condition, lugs on diagonally opposite corners of the body member engaging the ends of the end coils of the spring to hold the same expanded, other lugs on the body disposed diametrically opposite the inturned lugs and engaging the outer sides of the end coils of the spring to hold the coils against separation, and still other lugs adjacent the arcuate midpoint of the body engaging the outer sides of the end coils of the spring to further secure the coils against separation while the spring is in expanded condition within the retainer.

5. As an article of manufacture forming a clamp, an expanded cylindrical coil spring having a plurality of coils with the ends of its outermost coils lying substantially within the cylindrical confines of the spring, and a releasable member holding said spring expanded, said member being in the form of a unitary retainer having portions thereon against which the ends of the outermost coils of the expanded spring rest.

6. As an article of manufacture for securing a hose to a fitting, a cylindrical coil spring having a plurality of coils with the ends of the outermost coils lying substantially within the cylindrical confines of the spring, a retainer for the expanded spring in the form of a unitary member fitting about the spring and having inturned portions thereon against which the ends of the outermost coils of the expanded spring rest and inturned portions on the retainer engaging the sides of the outermost coils of the spring.

7. As an article of manufacture for securing a hose to a fitting, an expanded coil spring having more than one complete coil, the ends of the outermost coils lying substantially in a common plane which substantially bisects the coil longitudinally, and a unitary retainer fitting about the spring and having portions engaging the ends of the outermost coils thereof and holding the spring expanded, and other portions engaging and retaining the coils against separation.

8. The article of manufacture set forth in claim 7 in which the retainer is formed of a sheet metal and in which the portions thereof engaging the ends of the outermost coils of the spring comprise inturned lugs formed integrally with the remainder of the retainer.

DUNCAN NOLAN.

REFERENCES CITED

The following references are of record in the file of this patent:

UNITED STATES PATENTS

| Number | Name | Date |
|---|---|---|
| 246,484 | Field | Aug. 30, 1881 |
| 405,029 | Gordon | June 11, 1889 |
| 464,338 | Crisp | Dec. 1, 1891 |
| 724,818 | Crane | Apr. 7, 1903 |
| 996,478 | Francis | June 27, 1911 |
| 1,466,659 | Kabanuck | Sept. 4, 1923 |
| 1,504,037 | Furman et al. | Aug. 5, 1924 |
| 2,006,358 | Kurkjian | July 2, 1935 |
| 2,066,886 | Henn | Jan. 5, 1937 |
| 2,180,271 | Arras | Nov. 14, 1939 |

FOREIGN PATENTS

| Number | Country | Date |
|---|---|---|
| 8,611 | Great Britain | Sept. 1, 1910 |
| 10,042 | Great Britain | Apr. 29, 1913 |